US008515805B1

(12) United States Patent  
Rennison

(10) Patent No.: US 8,515,805 B1
(45) Date of Patent: *Aug. 20, 2013

(54) TARGETED ADVERTISEMENT PLACEMENT BASED ON EXPLICIT AND IMPLICIT CRITERIA MATCHING

(71) Applicant: Monster Worldwide, Inc., New York, NY (US)

(72) Inventor: Earl Rennison, Mountain View, CA (US)

(73) Assignee: Monster Worldwide, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/656,102

(22) Filed: Oct. 19, 2012

Related U.S. Application Data

(63) Continuation of application No. 12/110,213, filed on Apr. 25, 2008, now Pat. No. 8,296,179.

(60) Provisional application No. 60/915,557, filed on May 2, 2007.

(51) Int. Cl.
*G06Q 40/00* (2012.01)

(52) U.S. Cl.
USPC .......................................................... 705/14

(58) Field of Classification Search
USPC ............................................................ 705/14
See application file for complete search history.

(56) References Cited

U.S. PATENT DOCUMENTS

| 7,739,708 | B2 * | 6/2010 | Carson et al. | 725/36 |
| 2008/0195457 | A1 * | 8/2008 | Sherman et al. | 705/10 |

* cited by examiner

*Primary Examiner* — Eric T Wong
*Assistant Examiner* — Clifford Madamba
(74) *Attorney, Agent, or Firm* — Fenwick & West LLP

(57) ABSTRACT

A targeted advertisement placement system allows an advertiser to place an ad in front of an audience based on specific interests of the users in that audience, and based on the advertiser's own specific interests in users who should view the ad. The ad placement system collects information about a population of users and a population of advertisers to create profiles that can include both explicit and implicit criteria defining the user's/advertiser's interest. The explicit criteria can be explicitly provided to the ad placement system, can be extracted from documents provided by the user and/or the advertiser, etc. The implicit criteria include information learned by the system about the interests of both advertisers and users based on preferences implicitly expressed when providing feedback on search results. Using these criteria collected from advertisers and users to build profiles, the system can compare the profiles for matches to determine the best audience before which to place an advertisement.

18 Claims, 8 Drawing Sheets

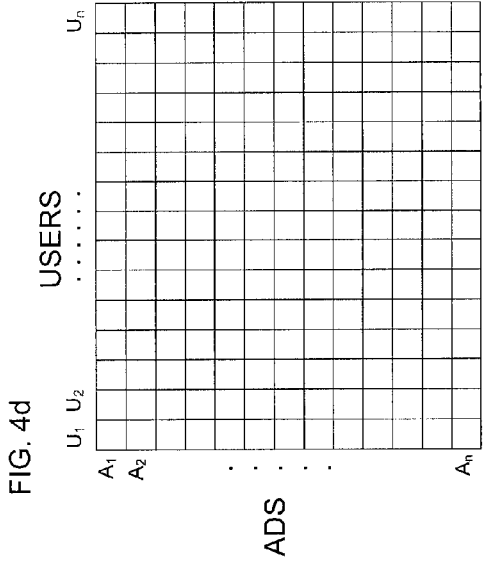
FIG. 4d VALUE MATRIX, V
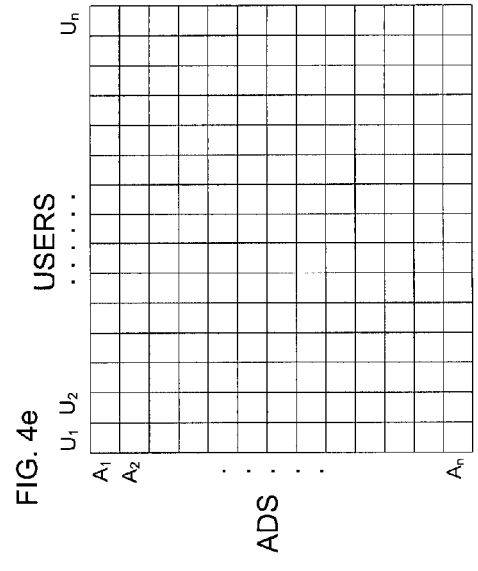
FIG. 4e PRICE MATRIX, P
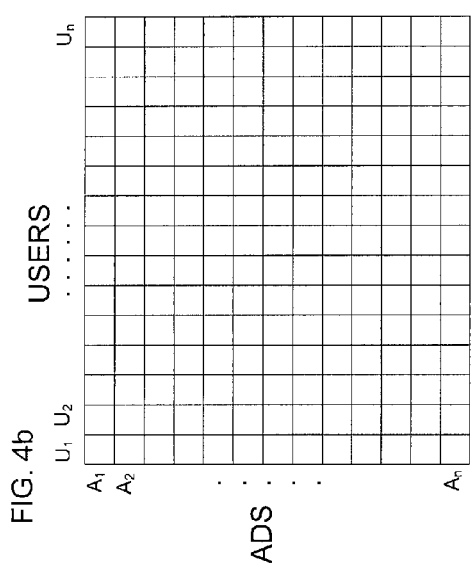
FIG. 4b USER-AD RELEVANCE MATRIX, R
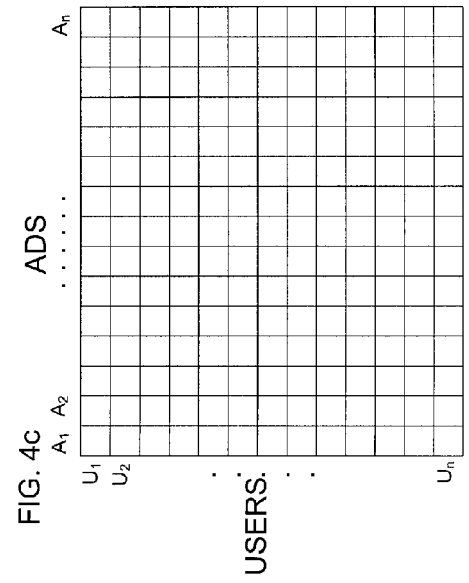
FIG. 4c AD-USER RELEVANCE MATRIX, R' though the user's resume reveals that the user actually has experience as a biochemist in a research laboratory. Thus, while employers associated with cruise ships might want to place ads regarding job openings before this user, an employer in a research laboratory looking for a biochemist might also be interested in having this user view an ad about his job opening. Again, effective ad targeting is hindered by incomplete knowledge about the interested audience.

In addition, the advertiser might have his own particular interests and preferences (possibly including hidden preferences) regarding the persons that he would like to view and potentially respond to his ad. For example, the employer at the research lab might be generally interested in a biochemist with 4 to 7 years lab experience, etc., but might more specifically want to target candidates with 6 to 7 years of lab experience that are familiar with a certain type of lab equipment. Thus, not only the user's preferences but also the advertiser's preferences are relevant in placing an advertisement. Therefore, an ad targeting system can be further impeded by lack of sufficient knowledge about the advertiser and the advertisement he would like posted.

TARGETED ADVERTISEMENT PLACEMENT BASED ON EXPLICIT AND IMPLICIT CRITERIA MATCHING

RELATED APPLICATION(S)

This application is a continuation of U.S. application Ser. No. 12/110,213, filed on Apr. 25, 2008, which claims the benefit of U.S. Provisional Application No. 60/915,557, filed on May 2, 2007, entitled "Targeted Advertisement Placement Based on Explicit and Implicit Criteria Matching," the entire disclosures of which are hereby incorporated by reference herein in their entireties for all purposes.

BACKGROUND OF THE INVENTION

1. Field of the Invention

This invention pertains in general to advertisement placement in online information systems, and more specifically to targeted advertisement placement using conceptual matching based on explicit and/or implicit criteria.

2. Description of the Related Art

While advertising using media such as television, magazines, etc. is common and has been well studied for years, advertising over other types of media, such as the Internet, is still a developing area. The Internet offers opportunities for advertisers to present advertisements to a captive audience, often while the audience members are conducting a search for some item or service of interest. However, placing an advertisement before the right audience can be challenging.

Various methods for placing an online advertisement in front of the right viewers have been used. For example, advertisers might place ads on popular and frequently visited websites where they are likely to be viewed by a large audience. Advertisers might also place ads on websites offering services related to their ads (e.g., travel insurance ads might be found on popular travel websites). Further, advertisers often target their ads to the right audience based on searches conducted by users and based on search terms employed by those users. Thus, the ad for travel insurance might appear in or near the search results of a search conducted for "vacation packages."

These ad placement methods, however, are often not sufficient to place the advertisement in front of the most relevant and interested audience. Ads placed on popular websites or websites offering related services will still be missed by many interested users who just do not visit those particular sites. In addition, a user's search terms sometimes fail to address the user's true interests. In some cases, the user may not be an effective searcher and so the search terms provide only minimal insight into the services or items in which the user might actually have an interest. The user may also have other hidden interests or preferences not reflected in the general search that is being conducted. For example, a search for a "Costa Rica vacation package" would not itself reveal the user's hidden preference for flying with certain airlines, using particular rental car companies, etc. Ad targeting can thus be hindered by the advertiser's lack of more specific and detailed information about his audience.

Further, a given user conducting a search commonly has many other interests beyond just those topics about which the user is conducting a search. For example, a user currently searching for "plane flights to Houston, Tex. for Christmas" might also currently be interested in vacation deals to Hawaii for a summer trip. Similarly, a job candidate might be conducting a search for a job as a "bartender on a cruise ship"

DISCLOSURE OF INVENTION

An advertisement placement system enables an advertiser to place an ad in front of an audience (e.g., one or more users conducting a job search) based on more specific and complete information regarding the interests of the users making up that audience. In addition, the advertiser's own specific interests in users that should view the ad can be considered, as well. A criteria collection module of the ad placement system collects information about a population of users and a population of advertisers to create user profiles and advertiser/advertisement profiles. The module can collect information regarding advertiser criteria for the types of users to be presented with the advertisement. In addition, the module can collect information regarding user criteria for selecting search results of interest (e.g., search results for a job search).

The advertiser and user criteria can include explicit and/or implicit criteria. Explicit criteria include criteria explicitly provided to the ad placement system. For example, a user can provide information about his specific interests or a list of desires in a search he might be conducting. Similarly, an advertiser can explicitly provide information about his interests in a user who might respond to his ad, seek his services, or otherwise fill his need.

In addition, other explicit criteria can be extracted, for example from documents provided by the user and/or the advertiser. For example, in a job search, a job candidate can provide to the ad placement system not only his list of explicit characteristics he would like in a job (e.g., salary, location), but he can also provide his resume from which the system can extract further criteria that can be included in the user's profile, such as title and industry.

The implicit criteria include criteria implicitly provided to the ad placement system through the actions of the users and advertisers. For example, the system can learn about the preferences of both advertisers and users implicitly expressed when providing feedback on search results. In the job search example, the system can learn about an advertiser's hidden preferences for biotechnologist job candidates who worked at GENENTECH™, INC. for a while, even though the advertiser did not explicitly provide this information, based on his tendency to provide positive feedback regarding such candidates. The advertiser can rate job candidates provided to him as search results in a search for job candidates to fill a job opening. From these ratings, the system can infer advertiser preferences. Similarly, the system can obtain information about preferences based on actions taken by the user or advertiser (e.g., selecting one link before another, etc.).

Using these criteria collected from advertisers and users, a profile creation module creates advertiser/advertisement profile(s) including the advertiser criteria and user profile(s) including the user criteria. A profile comparison module compares the advertiser/advertisement profile(s) and the user profile(s) to generate relevance scores and determine matches indicating whether a user should be presented with the advertisement, thereby determining the best audience before which to place an advertisement. For example, a match might be found where a job candidate user who graduated from Stanford University is searching for a software engineering job, and the advertiser has an ad for a software engineering job opening for which specifically he prefers candidates who are Stanford graduates.

An ad targeting module determines which of the advertisements to present to the users based on one or more placement factors. In some embodiments, the placement factors include computing relevance of each of the advertisements to each of the users, computing value of each of the users to each of the advertisers based on the relevance of each of the advertisements to each of the users, and computing a price for presenting the advertisement to each of the user. The ad targeting manager presents to the users the advertisements for which a positive determination to place the ad is made.

In some embodiments, some of the steps are performed online as a user conducts a search of a database. The user's search string can be received and used in computing a search relevance of the advertisement to the user based on the search string. In some embodiments, the search relevance is combined with the price and value information for that user in determining whether to present the advertisement to the user.

In other embodiments, the system applies a cost function to determine a cost of placing the advertisement before the user. This pricing information can be considered in the placement of ads before users along with the degree of match between the user and advertiser/advertisement profiles, and other factors. If the ad targeting module determines that the ad should be presented to the user, the module then presents the advertisement (e.g., alongside search results, upon login to a user account, via email or another method of sending the ad, etc.).

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 4b is an illustration of user-advertisement relevance matrix, according to one embodiment of the present invention.

FIG. 4c is an illustration of an advertisement-user relevance matrix, according to one embodiment of the present invention.

FIG. 4d is an illustration of a value matrix, according to one embodiment of the present invention.

FIG. 4e is an illustration of a price matrix, according to one embodiment of the present invention.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

I. System

Figure 1:
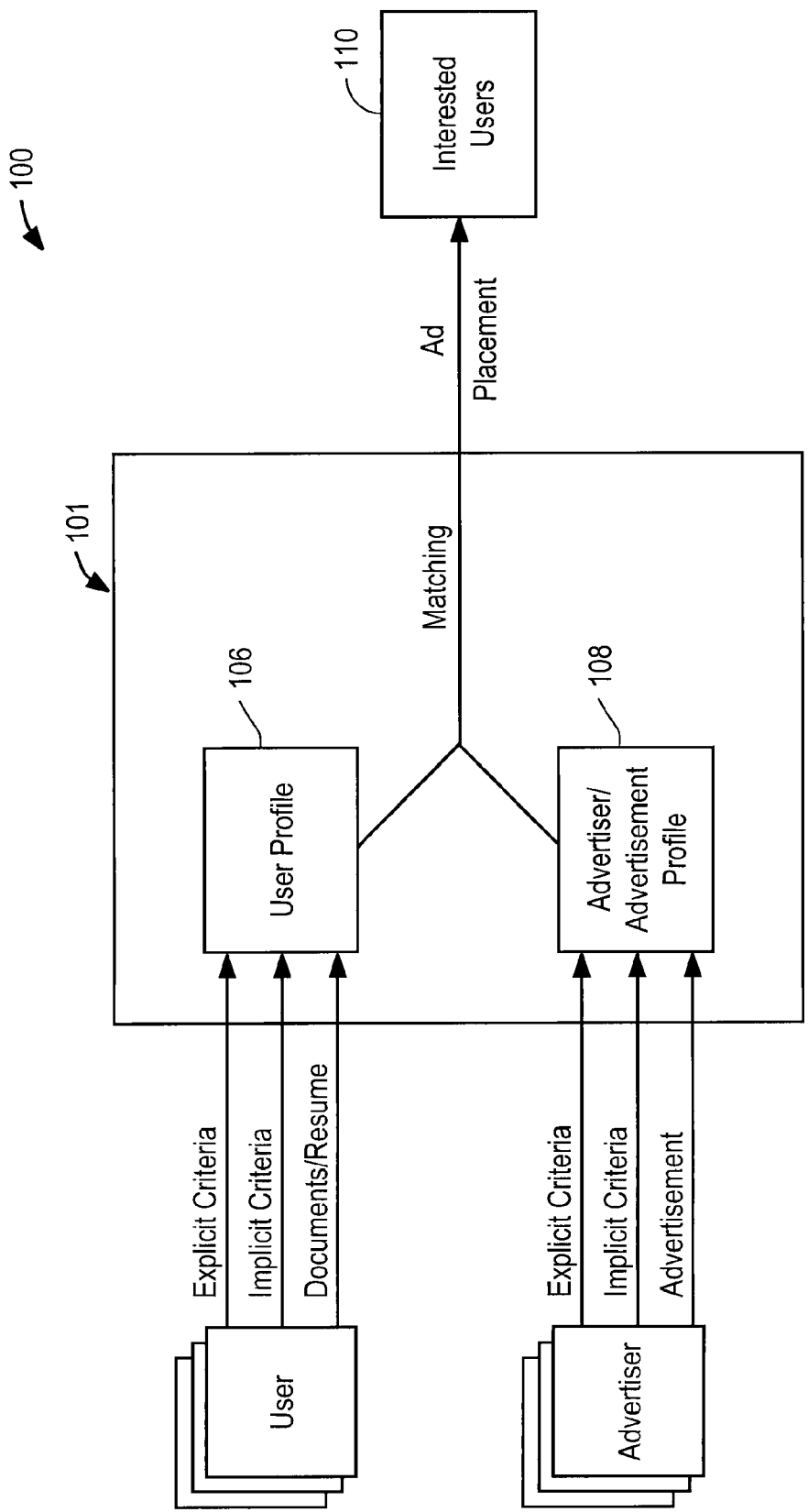
FIG. 1 is a high-level block diagram illustrating the ad placement system according to one embodiment.

Referring to FIG. 1, there is shown a high-level block diagram of the ad placement system 100 for placing an advertisement from an advertiser before interested users. Only a brief overview of the high-level system is provided here, but a more detailed description of the functional modules in the system 100 is provided regarding FIG. 3 below.

The system 100 is configured to operate in conjunction with any type of information system 101, which may be a search engine, a database, a website (or collection thereof), or the like. Generally, the user shown in FIG. 1 might be a user conducting a search for a particular good or service using the information system 101. For example, the user might be conducting a search of a website associated with the ad placement service, such as a job search website that also allows for placement of ads before user. As another example, the user might also be conducting a search on the Internet using any other search engine (e.g., GOOGLE™, YAHOO!®, etc.) or reviewing/searching a particular website 101 separate from the ad placement service. In addition, the system 101 can be a system for sending the ad to a user (e.g., via email, fax, phone, text message, etc.). The advertiser shown in FIG. 1 is a party interested in placing an advertisement before a set of interested and relevant users. For example, the advertisement could appear along with the results of the user's search, near a blog, article, or other piece of information being read by the user, in an email to the user, etc. If the user were searching for vacation information about Tahiti, an advertisement for a Tahitian Islands travel package could be posted for the user's review.

To ensure that the ad is placed in front of the most relevant and interested users, the ad placement system 100 can collect explicit and/or implicit criteria from one or both of the user and the advertiser. In some embodiments, the ad placement system 100 collects information regarding the criteria that the user is looking for in his search results and that the advertiser is looking for in users who should view an ad. The system 100 can collect this information explicitly from one or both of the user and the advertiser, including collecting documents from the user/advertiser from which information can be extracted. In a job search environment, the system 100 can collect information from a user's resume, from a job description provided by the advertiser, from the advertisement itself, etc.). The system 100 can further collect various implicit criteria from the user and/or the advertiser by gathering information about the preferences of the user/advertiser based on their actions. As the user and/or the advertiser conduct searches, the system can determine certain hidden preferences that might not have been explicitly provided. For example, in a job search, a user's tendency to give high ratings to jobs in Silicon Valley, Calif. can indicate a preference that was not explicitly stated, which can be used to better target job ads of interest (e.g., in Silicon Valley) to that job candidate. It is appreciated that the collection of preferences for advertisers and users happens independently of each other.

Once the system 100 has collected criteria from the user and the advertiser, the system 100 can create a user profile 106 and an advertiser/advertisement profile 108. Again, these profiles are created independently for each user and each advertiser/advertisement without dependency on the other. The system 100 can match these profiles 106, 108 (described more below) to identify which set of interested users 110 a particular ad should be placed before.

As used herein, the term "advertisement" includes any type of advertisement intended to capture the interest of an individual, such as an ad associated with a good or service, for an event or meeting, for a sweepstakes, to provide general information about something, results for a recommender system, and so forth. The term "concept" includes any type of information or representation of an idea, topic, category, classification, group, term, unit of meaning and so forth, expressed in any symbolic, graphical, textual, or other forms. For example, concepts typically included in a résumé include university names, companies, terms identifying time (e.g., years), experiences, persons, places, locations, names, contact information, hobbies, publications, miscellaneous information, grade point averages, honors, associations, clubs, teams, any type of entity, etc, or a collection of one or more of these. A concept can also be represented by search terms that might be used in a database search, web search, literature search, a search through statutes or case law, a patent search, and the like.

While many embodiments described herein refer to ad placement in the case of job searches or searches for an open job position or a job candidate to fill a position as an example, the invention can be universally applied to ad placement in general. For example, the invention can be used in the placement of ads in various kinds of searches, including searches for goods or services of interest, general information searches, searches through news or other articles or publications, and so forth. Thus, the examples described here are to be considered illustrative but not limiting of the scope of the invention or implying necessary or essential features or characteristics.

Figure 2:
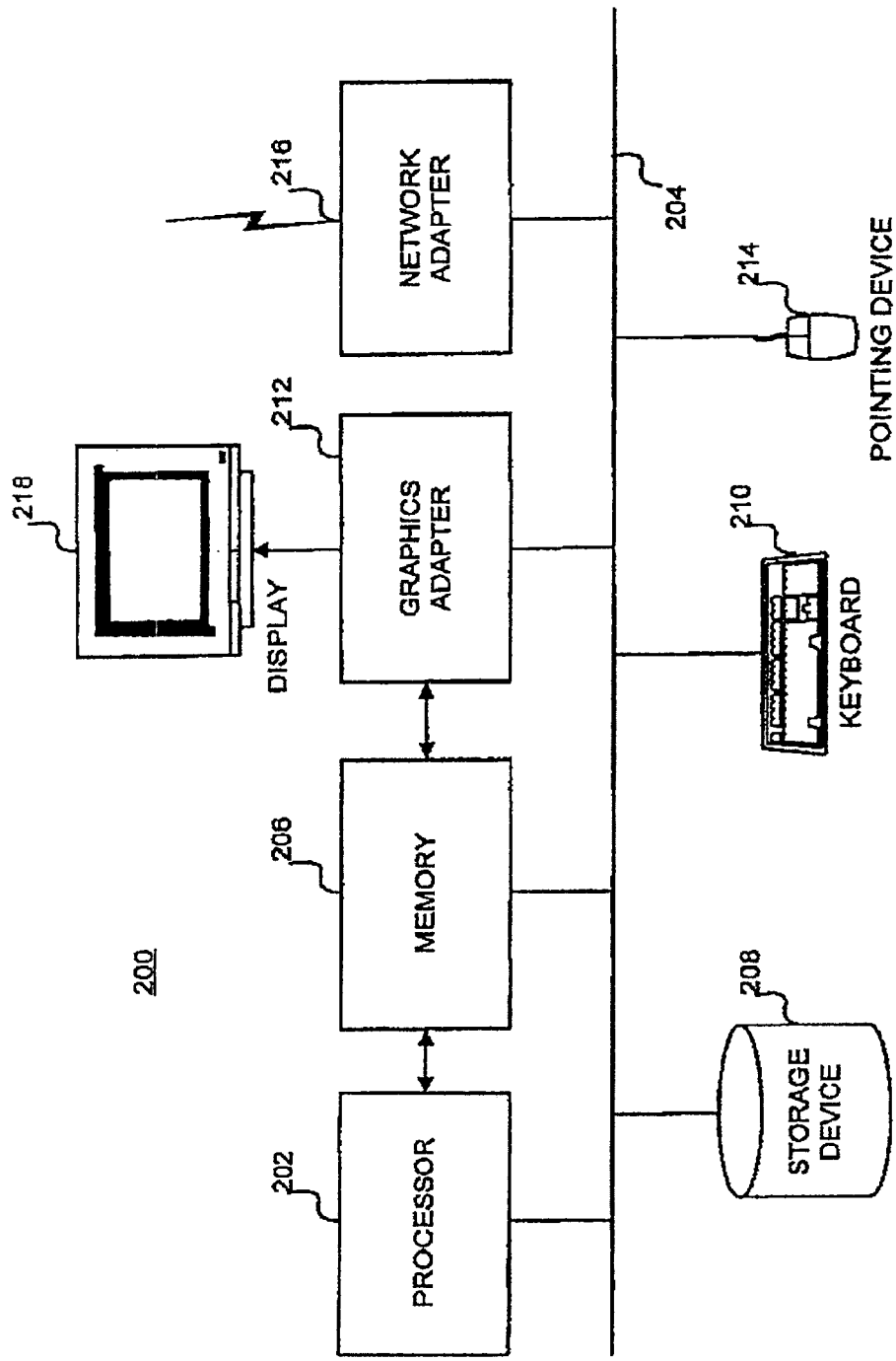
FIG. 2 is a high-level block diagram illustrating a standard computer system 200 for use with the present invention.

FIG. 2 is a high-level block diagram illustrating a functional view of a typical computer system 200 for ad placement, according to an embodiment of the present invention. One or more of the components of the computer system 200 may be missing or modified when used with system 100. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212. The processor 202 may be any general-purpose processor such as an INTEL x86, SUN MICROSYSTEMS SPARC, or POWERPC compatible-CPU, or the processor 202 may also be a custom-built processor. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The pointing device 214 may be a mouse, track ball, or other type of pointing device, and is used in combination with the keyboard 210 to input data into the computer system 200. The graphics adapter 212 displays images and other information on the display 218. The network adapter 216 couples the client computer 110 with the Internet 112.

As is known in the art, the computer system 200 is adapted to execute computer program modules for providing functionality described herein. In this description, the term "module" or "manager" refers to computer program logic for providing the specified functionality. A module/manager can be implemented in hardware, firmware, and/or software. Where the any of the modules/managers described herein are implemented as software, the module/manager can be implemented as a standalone program, but can also be implemented in other ways, for example as part of a larger program, as a plurality of separate programs, or as one or more statically or dynamically linked libraries. It will be understood that the modules/managers described herein represent one embodiment of the present invention. Certain embodiments may include other modules/managers. In addition, the embodiments may lack modules described herein and/or distribute the described functionality among the modules/managers in a different manner. Additionally, the functionalities attributed to more than one module/manager can be incorporated into a single module. In one embodiment of the present invention, the modules/managers are stored on the storage device 208, loaded into the memory 206, and executed by the processor 202. Alternatively, hardware or software modules/managers may be stored elsewhere within the computer system 200. Similarly, a computer program product comprising a computer-readable medium (e.g., a CD-ROM, a tape, a DVD, memory, flash memory, etc.) containing computer program code for performing functionalities described here is contemplated.

Figure 3:
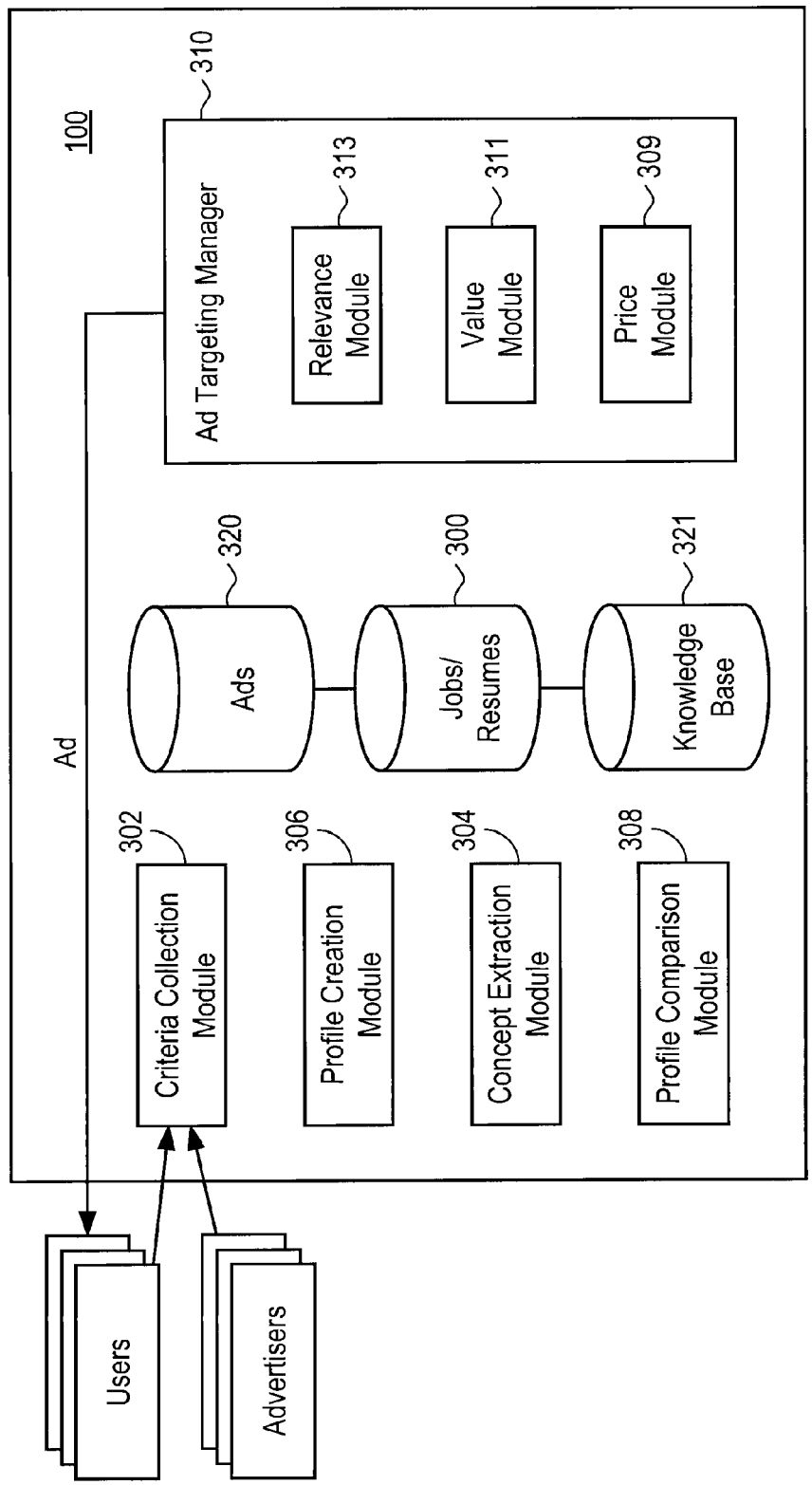
FIG. 3 is a high-level block diagram illustrating the functional modules within the ad placement system, according to one embodiment of the present invention.

Referring now to FIG. 3, there is shown a high-level block diagram illustrating the functional modules within the ad placement system 100, according to a first embodiment of the present invention. The system 100 includes a criteria collection module 302, a concept extraction module 304, a profile creation module 306, a profile comparison module 308, and an ad targeting manager 310, which includes a relevance module 313, a value module 311 and a price module 309. Those of skill in the art will recognize that other embodiments can have different and/or additional modules than those shown in FIG. 3 and the other figures. Likewise, the functionalities can be distributed among the modules in a manner different than described herein.

As explained above, the system 100 determines which users might be most interested in viewing particular ad based upon certain criteria collected by the system, and allows for the placement of relevant ads before interested users. As also explained above, in some embodiments, the ad placement system 100 allows for placement of ads to users conducting searches of databases associated with the ad placement service. In these embodiments, the system is used with one or more databases 300 storing information that might be of interest to either or both of the user and the advertiser. For example, the database 300 can store a collection of resumes and job descriptions, as illustrated in FIG. 3. The user can conduct searches of the information in the database 300 and the system 100 can post the ads to the user along with the results of the search. Thus, in this embodiment, there can be two overall processes operating concurrently. One process includes the searching of information stored in one or more databases, as carried out by the users or advertisers. The other process, as carried out by the system 100, includes the collection of information about users and/or advertisers conducting those searches to allow targeting of ads to the users based on collected information.

As also explained above, the system 100 can be used to place the ad before interested users in a number of other ways. For example, the user might be conducting a search of information separate from the ad placement system. Where a user is conducting a search of the Internet, the system 100 can be used to post relevant ads for the user's consideration along with the search results. Similarly, if a user is viewing an article, using a blog, or otherwise reading or interacting with a website, the system 100 can be used for ad placement to those users, as well. In addition, the system 100 can be used to push ads out to the users via email, text message, fax, and other similar methods by which advertisement can be provided.

In some embodiments, most of the information collection and relevance determination (described below) regarding which users should view which ads is performed offline and in advance before the user conducts the search during which the ad is posted. Similarly, determinations regarding pricing and other factors taken into consideration (described below) when determining which users should view what ads, and where they should be placed can be computed offline, as well. In other embodiments, however, some or all of these relevance/pricing/etc. determinations are performed online, in real-time or near real-time, as the user is conducting the search or is otherwise performing some action during which ad targeting might be desirable. Thus, the overall system 100 can perform the method, as described in detail below, offline or online, or can perform some parts of the method offline and some parts online.

As shown in FIG. 3, information relevant for ad placement can be collected by the criteria collection module 302, which is configured to collect criteria from each user and each advertiser. The advertiser/advertisement criteria indicate the preferences of advertisers in users to be presented with an advertisement (e.g., preference to have an ad provided to a job candidate in California). These criteria can be specific to the particular ad that the advertiser wishes to have placed, since the advertiser can submit numerous different ads. The user criteria indicate preferences of users in search results (e.g., in a job search preference for a job located in California).

As described above, the criteria collected can include both explicit and implicit criteria. In some embodiments, the user and/or the advertiser provide explicit criteria directly to the criteria collection module 302. As one example, where users and advertisers register for an account to access a website or database (e.g., a job search database), the module 302 can collect information by, e.g., providing the user/advertiser with a list of questions to answer, fields to fill out in a web form, a history of web searches, advertisement copy, etc. The module 302 can also be configured to request that certain identifying information be provided (e.g., name, e-mail address, etc.), and the module 302 may also request that the user/advertiser provide information about certain interests and preferences by asking specific questions or otherwise asking for a summary of preferences. For example, in a job search scenario, a job candidate would provide his preferences in a job opening (e.g., bartending position, in California, with a large hotel, etc.). Similarly, the users and/or advertisers can conduct searches of one or more databases of information, such as database 300, and the search queries used by the users/advertisers can provide further explicit criteria to be considered in ad targeting. The system 100 can collect search query information from a regular user of the system 100 over a period of time and store this information for usage in ad placement. In some embodiments, the system 100 may only have information regarding the current search being conducted, and so may only use this information collected online during the search.

Beyond just stating preferences, the system module 302 can also collect explicit criteria when collecting documents or other information from the advertiser/user from which relevant criteria can be extracted. For example, in the job search scenario, a job candidate can be asked to provide his resume to the system 100 from which other information can be obtained beyond the job candidate's stated preferences. While the job candidate's stated preferences may include only information related to a bartending job, the module 302 can collect from the job candidate's resume information about his experience as a biochemist that can be used in placing relevant ads. In the same manner, a user looking to hire a job candidate to fill a job opening can provide a job description from which information can be extracted about the hiring company's preferences in a job candidate. In some embodiments, the module 302 can also collect criteria based on the ad submitted by the advertiser. In fact, the advertiser/ad profile may simply be made up of the ad itself that the advertiser wishes to place or information collected from the ad. In other embodiments, the profile includes other information about the particular advertiser too.

The criteria collection module 302 can also collect implicit criteria from one or both of the user and the advertiser. As explained above, the user and the advertiser can both conduct searches of one or more databases 300. During these searches, the user/advertiser can provide feedback on the search results, indicating which results are satisfactory. For example, the user/advertiser could vote on or otherwise rate each (or some) search result or provide feedback indicating the quality of the results. The criteria collection module 302 can collect this feedback information or the ratings/votes provided by the user/advertiser as implicit criteria that further provide information about the user's and the advertiser's preferences. For example, where the advertiser is a job provider/employer, he can explicitly state that he is interested in a job candidate with 4 to 7 years experience, but he may strongly prefer candidates with 6 to 7 years experience. This implicit preference would be identified when that advertiser conducts searches of resumes in the database 300, and gives the highest rating to resumes showing 6 to 7 years experience. Thus, having identified an implicit criterion of the advertiser, the system 100 can then direct the advertiser's ad to job candidates of the right type having 6 to 7 years experience. In some embodiments, the implicit criteria can be collected during various different types of multi-way nested searches conducted by advertisers and users. Multi-way nested searches are described in detail in U.S. Utility application Ser. No. 11/735,399, filed on Apr. 13, 2007, entitled "Multi-Way Nested Searching" (Multi-Way Nested Searching Application) which is hereby incorporated herein in its entirety, including any appendices or attachments, for all purposes.

In addition, implicit criteria or feedback can be collected without even requiring that the user/advertiser vote on search results. For example, the system 100 can gather information from the user's or advertiser's actions with regard to the search results provided. If the user selects or otherwise views certain results first, this may indicate that those results are more important than other results that the user selects/views later or does not select/view at all. Similarly, information can be acquired when users take other actions like saving a search result, emailing or otherwise forwarding a search result, contacting the individual who posted the particular item in the search result, and so forth.

In some embodiments, the system 100 includes a concept extraction module 304 that extracts concepts for use in ad targeting. This module 304 extracts concepts from information that will be included in the user and/or advertiser profiles. The module 304 can extract concepts from criteria explicitly provided by the user/advertiser, documents provided by the user/advertiser (e.g., resumes, job descriptions, ads, etc.), search strings used in searching, feedback generated in the searches, etc. Concept extraction conducted by the module 304 can be performed either offline or online.

As one example of how the process of extracting information from documents can work, the system can receive documents in various different formats (e.g., unstructured documents (e.g., MS Word, PDF, and e-mail messages), clear text documents, structured documents, documents containing structured data (e.g., XML documents, RDF documents, JSON documents, OWL documents, etc), and so forth). For example, where the system receives an unstructured document, the system can convert it to a plain/clear text document by extracting clear text from the document (e.g., converting formatted documents into unformatted text documents). The system can take this clear text document and extract semantic structure from the unstructured text content, thereby converting an unformatted text document into a semantically structured document. In some embodiments, the semantically structured documents are parsed into sub-components that can include tokens, phrases, terms, sub-strings, or other text strings, matches to different rules or regular expressions, and so forth. The semantically structured document can contain a hierarchy of structural elements that have semantic labels and attributes that describe fields of text data.

The system can take the structured document produced by the extraction and can interpret the structure of the document to tag the document structure with concepts defined in one or more knowledge bases 321. In many cases, the fielded text data of the document may contain errors, variations or partial text representations of concepts, etc. that may requiring searching through several text data fields to determine a concept connection. By connecting the semantic structure of the document to one or more knowledge bases 321, the document is connected into an indexed semantic network of relationships represented by concepts and relationships between concepts. As one example, the concept "software engineer" extracted from an ad provided by an advertiser could be linked to other concepts via the knowledge base(s) 321, such as the more general concept of "engineer." In this manner, the advertiser/ad profile associated with this ad can be targeted to users with software engineering experience beyond just those who have indicated themselves to fall under the heading of "software engineer," since the ad is also linked to the more general concept of "engineer."

The module 304 is also configured to extract concepts from a search strings used by a user/advertiser to conduct a search of information in the database 300. For example, in a search for a job, a job candidate may input search terms "experienced software engineer in the Bay Area." The concept extraction module 304 would then extract from this query the terms "engineer" and "software engineer" and "Bay Area." In some embodiments, concepts are identified in an input string of text by dividing the input string into one or more input tokens that can be one or more terms or sub-strings of text. These input tokens can be matched against concepts in a knowledge base 321 (which can be identified with patterns divided into one or more pattern tokens). In this manner, the module 304 identifies and extracts concepts in a search string and matches these to concepts defined in one or more knowledge bases 321 in the presence of errors or variations in the description of those concepts. The matches can also be scored resulting in the selection of the best concept matches for that input string.

Construction of knowledge bases, the process of concept extraction from documents, input strings, etc., and the matching of concepts to linked concepts in the knowledge bases, according to one embodiment, is described in more detail in Personalized Information Retrieval" (Contextual Personalized Information Retrieval Provisional) "U.S. patent application Ser. No. 11/756,951, filed on Jun. 1, 2007, entitled "Contextual Personalized Information Retrieval" (Contextual Personalized Information Retrieval Application), in U.S. patent application Ser. No. 11/757,177, filed on Jun. 1, 2007, entitled "Constructing A Query For Contextual Personalized Information Retrieval," in U.S. patent application Ser. No. 11/757,040, filed on Jun. 1, 2007, entitled "Scoring Concepts For Contextual Personalized Information Retrieval," in U.S. patent application Ser. No. 11/757,088, filed on Jun. 1, 2007, entitled "Learning Based On Feedback For Contextual Personalized Information Retrieval," in U.S. patent application Ser. No. 11/757,199, filed on Jun. 1, 2007, entitled "Using Inverted Indexes For Contextual Personalized Information Retrieval," and also in U.S. patent application Ser. No. 11/253,974, filed on Oct. 18, 2005, entitled "Concept Synonym Matching Engine," (Concept Synonym Matching Engine Application) each of which is hereby incorporated by reference herein in its entirety, including an appendices or attachments thereof, for all purposes.

The profile creation module 306 can use the criteria collected by the criteria collection module 302 to generate user profiles 106 and/or advertiser/ad profiles 108. The profiles created can be based on explicit criteria only, implicit criteria only, or both. The profile can simply be a collection of information or criteria for a user and/or an advertiser indicating user/advertiser preferences. The profiles created by the module 306 can also change and be updated over time. As users and advertisers conduct more searches of information stored in database 300 and provide feedback on results, the collection of implicit or learned criteria about those users/advertisers can grow. The profile creation module 306 can add this information to the profiles or otherwise update the profiles to express any new or changed preferences. In addition, it is also possible for users/advertisers to have multiple profiles with different information in each. For example, where an advertiser is a job provider looking to hire a job candidate, the advertiser can create multiple profiles (or divisions within the same profile) for each job of interest or each ad that the advertiser wants to place in front of relevant job candidates. The module 306 can also place in the correct profile for that advertiser the implicit criteria collected in a job search since the advertiser may be conducting multiple searches for multiple types of candidates producing criteria relevant to the placement of different job ads.

Figure 4A:
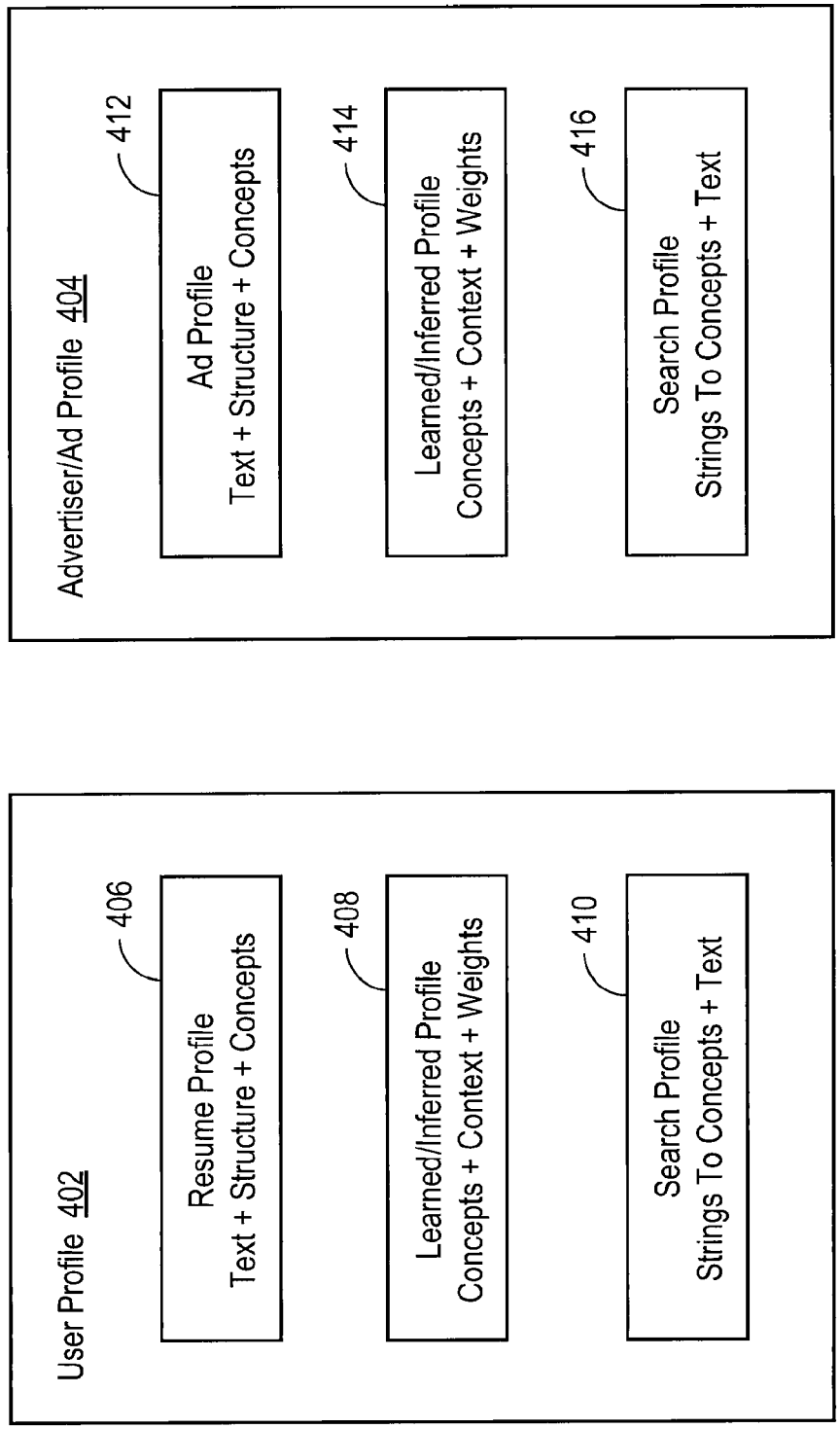
FIG. 4a is an illustration of a user and an advertiser/ad profile, according to one embodiment of the present invention.

FIG. 4a shows an example of a user profile 402 and an advertiser/ad profile 404, according to one embodiment. The user profile 402 includes a resume profile 406 including information extracted from a user's resume provided to the system 100. The resume profile 406 can include the text of the resume itself, the resume document structure, and the concepts extracted from the resume by module 304. The user profile 402 also includes a learned or inferred profile 408 including implicit criteria learned about the user during the user's activities including during the searching conducted by the user. The learned profile 408 can include concepts associated with the information learned, context associated with the search (e.g., where the user works or lives), and weights associated with the learned information. The search profile 410 can include the search strings associated with a search conducted by the user (e.g., a search of a job database with various job requisitions), including the concepts extracted from the string and the text of the string. The advertiser/ad profile 404 includes information similar to the user profile 402, including an ad profile 412 with information extracted from the ad itself, a learned/inferred profile 414 with information learned based on the advertiser's activities, and a search profile 412 with information about a search string for a search conducted by the advertiser (e.g., a search of a resume database). The Contextual Personalized Information Retrieval Application and Contextual Personalized Information Retrieval Provisional provide more detailed information regarding examples of how concepts text, structure, and concepts associated with a document can be extracted/used, how the learning or inferred profile 408 can be created including applying weights, how search strings can be converted to concepts, etc.

Returning to FIG. 3, the profile comparison module 308 is configured to compare advertiser/ad profiles and user profiles for matches. This comparison can be used to determine whether a user is a match for viewing the advertisement. In some embodiments, the profile comparison module 308 uses conceptual matching to match concepts extracted by the concept extraction module 304 from information provided by the user and the advertiser. An example of how to perform concept matching is described in detail in the Contextual Personalized Information Retrieval Provisional, in the Contextual Personalized Information Retrieval Application, and in the Concept Synonym Matching Engine Application.

The profile comparison module 308 thus matches the user and advertiser profiles to find similarities between the two. Where there are sufficient similarities, then this indicates that the advertiser's ad should be placed before a user. Multiple user profiles can be compared against multiple advertiser/ad profiles to find matches. Again considering the job search scenario, the profile comparison module 308 might find a match between an advertiser/ad profile showing an interest in job candidates that are software engineers in the Bay Area and a user profile showing an interest in software engineer jobs in the Bay Area. In some embodiments, the module 308 can match specific concepts extracted from both the user's and advertiser's profiles (e.g., concepts such as "engineer," "software engineer," and "Bay Area") to determine that there are similarities suggesting that the advertiser's ad should be placed in front of this particular user who is likely an interested user 110. Further, where an advertiser's profile is simply made up of the ad that he would like to place, the matching occurs between the user's profile (including any explicit and implicit criteria) and the actual ad to be placed to determine whether to present the ad to the user.

The profile comparison can be done online or offline. In some embodiments, the matching of a user to an ad is performed offline, and before the user conducts the search or otherwise takes the action that will allow presentation of the ad to that user. In these embodiments, when an ad is received from an advertiser for posting to interested users, the system 100 can determine right away which user's should view that ad, and can present the ad to those users when the opportunity arises (e.g., the user goes online and conducts a search). Similarly, once the system 100 has had the opportunity to do the comparison, the system 100 can send relevant ads to matching users via email or other mechanisms. In other embodiments, the matching is done online, as the user conducts a search, reads the blog, etc. In this case, when the user conducts the search, the system 100 performs the match of the user profile to the various ads received by the system 100 to determine which ads the user should see with his search results. In some embodiments, the user profile may simply include the information collected on-the-fly regarding the current search being conducted by the user, and the system can match this information to various ads to determine which ads to provide to that user. In other embodiments, the system 100 uses a combination of information gathered offline and online in the profile comparison.

The ad targeting manager 310 determines whether to provide an advertisement to a particular user based on one or more placement factors (described below). Where it is determined that the ad should be provided to the user, the manager 310 then places the advertisement before the user. The placement factors can include various factors taken into account by the manager 310 in the placement decision, including the relevance of the ad to the user, the value of placing the ad before the user, the price of placing the ad before the user, etc. As shown in FIG. 3, the ad targeting manager can include modules that perform each of these placement factor determinations, including the relevance module 313, the value module 311, and the price module 309. The determination made by the ad targeting manager 310 can be conducted online or offline, or can include components that are online and other components that are offline.

With regard to the relevance module 313, this module can determine how relevant the ad is for the particular user, and this relevance determination can be used by the ad targeting manager 310 in deciding whether or not an ad should be presented to a user. The module 313 can consider matching information provided by the profile comparison module 308 indicating whether the user is a match for viewing an ad. In addition, the module 313 can use the degree of match of the advertiser/ad and user profiles, as matched by the module 308, to determine how good the match is for that user to view that ad. If the ad includes content that the user is likely to be interested in based on the match of the ad to the user's profile, the ad will be considered relevant by the ad targeting manager 310, and will be considered for placement before the user. Where the user is determined to be a match for numerous ads (e.g., more ads than can be presented to the user at a time), the ads with a higher degree of match can be selected for presentation. Ads that have a lower degree of match may be presented subsequent to the other ads, or presented less frequently to the user, or possibly not presented at all to that user. Application of degree of match functions in relation to concept matching is described in the Contextual Personalized Information Retrieval Provisional and in the Contextual Personalized Information Retrieval Application.

The manager 310 can also rank the various ads to be presented to a given user to determine which ads will be presented to that user (if the user is found to match more ads that can be presented to that user at a given time). For example, in the job scenario, an ad for a job in bartending is placed before a user looking for a bartender job. However, since that user also submitted his resume, the system 100 may have determined that he was previously employed as a biochemist. Nonetheless, the module 310 can first provide all bartending job ads to that user or place these more prominently or more frequently than the biochemist ads since the user is less likely to respond to the biochemist ads. The module 310 can place in front of a user the ad that had the best match for that user, the most similarities to the more relevant and recent parts of that user's profile, and so forth.

In some embodiments, the system 100 applies a user-advertisement relevance matrix, R, or an advertisement-user relevance matrix, R', (or a combination of the two) to determine the relevance of an ad to a user or relevance of the user to the ad. In the example shown in FIG. 4b, a user-advertisement relevance matrix, R, is used to compare users against various ads, and the relevance of each ad to each user is determined. The ads can be given relevance scores for each user, which can be used to determine how relevant each of the ads is for that user. For every user, there will be a relevance score for each ad. For example, where the scores are from 0 to 1, with 1 being a perfect match and 0 being a perfect mismatch, the matrix will be filled in with a collection of different scores for each ad relative to each user. Thus, the user-ad relevance matrix, R, of FIG. 4b is applied when looking at a situation where an advertiser is looking for a user who might, for example, fill his job description needs.

Similarly, the users can be scored against the ads in the advertisement-user relevance matrix, R', of FIG. 4c, which represents the relevance of each user to the ads. In some embodiments, these matrices are used separately and possibly only one of the two matrices is used. In other embodiments, the matrices can be combined. It is not required that the entire matrix described here (or any other matrix described below) be completed for an ad placement determination. Thus, the ad-user relevance matrix, R', of FIG. 4c is applied when looking at a situation where the user is himself looking for jobs and advertising his job skills. In another embodiment, the same matrix, R, of FIG. 4b is used for this analysis, as well, except that in this embodiment, the advertiser is the individual who is looking for a job and the users are employers having job openings to be filled.

The value module 311 determines the value of placing the ad before the user. The module 309 can consider the value of a user in the context of who the advertiser is and what ad is being placed, since user value can depend upon the advertiser's interests and the particular ad being placed. For example, the advertiser may consider it more valuable to place his ad for a job located in the San Francisco area before users who live in that area. It may also be of more value to place a software engineer job ad before a user with 5 years of experience in software engineering than one with only three years of experience.

In one embodiment, a value matrix, V, is used to determine the value of placing the ad before a user. An example is shown in FIG. 4d. Similar to the relevance matrix, the value matrix provides value scores for each ad relative to a user that can be used to determine the value of presenting the ad to the user. The value matrix, V, can be considered in terms of Supply and Demand, where Supply is measured based on the number of users who score well for a particular ad (e.g., score well for a job), and Demand is a measure based on the number of ads/jobs for which a user scores well. Thus, using the user-ad relevance matrix, R, the Supply is the sum of the scores across a row (i.e., the sum of the scores for all users) for a particular ad. For example, using the user-ad relevance matrix of FIG. 4b, R, where the rows correspond to the Ads and the columns correspond to the Users, this would be the sum of scores of all of the users ($R_{1,1}, R_{1,2} \ldots R_{1,N}$) for $Ad_1$. Where each score is a value between 0 and 1, then the sum of the scores for an ad is between 0 (e.g., where the score is 0 for each user) and the total number of users (e.g., where the score is 1 for each user). As one example, when calculating the Supply for $Ad_1$ (e.g., number of users scoring well for that ad), the sum of the relevance scores from a relevance matrix, such as that of FIG. 4b, would be determined for $Ad_1$. If there are five users (N=5), the scores for the users relative to $Ad_1$ might be as follows: $R_{1,1}=0, R_{1,2}=0.5, R_{1,3}=1, R_{1,4}=1, R_{1,5}=0.3$. The sum of these scores (2.8) would represent the Supply for $Ad_1$.

Using the user-ad relevance matrix, R, the Demand is the sum of the scores going down the column for a particular user. For example, in the user-ad relevance matrix, R, of FIG. 4b, this would be the sum of the scores of all of the ads ($R_{1,1}, R_{2,1} \ldots R_{M,1}$) for $User_1$. Where each score is a value between 0 and 1, then the sum of the scores for an ad is between 0 and the total number of ads. As one example, when calculating the Demand for $U_1$ (e.g., number of ads for which that user scores well), the sum of the relevance scores from a relevance matrix, such as that of FIG. 4b, would be determined for $User_1$. If there are five ads (M=5), the scores for the ads relative to $User_1$ might be as follows: $R_{1,1}=1, R_{2,1}=1, R_{3,1}=0, R_{4,1}=1, R_{5,1}=0.5$. The sum of these scores (3.5), would represent the Demand for $User_1$.

In some embodiments, a Normalized Supply and a Normalized Demand are calculated. The Normalized Supply can be represented as shown below, where the Normalized Supply equals the log of the sum of the scores for the users divided by the log of the total number of users, and the Normalized Demand equals the log of the sum of the scores for the jobs/ads divided by the log of the total number of jobs/ads, as follows:

$$\text{Normalized Supply} = \frac{\log(\Sigma Score u)}{\log(fu)}$$

$$\text{Normalized Demand} = \frac{\log(\Sigma Score j)}{\log(fj)}$$

These values can also be calculated without using logarithms. In this case, referring again to the example above, the sum of the scores for the users (2.8) is divided by the total number of users (5) to produce the Normalized Supply (0.56), while the sum of the scores for the ads (3.5.) is divided by the total number of users (5) to produce the Normalized Demand (0.7).

In this embodiment, Supply and Value are inversely related, while Demand and Value are directly related. As Supply goes up, the Value goes down, since a large supply of users scoring well for an ad/job means that each individual user is less valuable. The overall pool of users from which to choose is large. As Supply goes down, then Value goes up, since the fewer people that match the criteria for the ad/job, the higher the Value of each user to the advertiser. Similarly, as Demand goes up, Value goes up, because if the more people who want to advertise to that user, the higher that user's value. As Demand goes down, Value goes down, since fewer people wanting to advertise to that user means that user is less valuable. Thus, the Supply is the sum of the scores of each user against the job criteria, while the Demand is the sum of the scores of a user against the criteria of each of the jobs. Thus, in one embodiment, Value can be represented as follows:

$$\text{Value} = (\text{Demand})\left(\frac{1}{\text{Supply}}\right) = \sqrt{\left(\frac{\log(\Sigma Score j)}{\log(fj)}\right)\left(\frac{\log\left(\frac{fu}{\Sigma Score u}\right)}{\log(fu)}\right)}$$

In this embodiment, a value score is calculated for the value of $Ad_1$ relative to $U_1$, continuing with the example from above.

A similar analysis can be performed using the ad-user relevance matrix of FIG. 4c, applying the same notions of Supply and Demand to that matrix. In that case, an ad-user value matrix, V', (not shown in Figures) can be created having the same general form as the ad-user relevance matrix, R', for comparing the value of the users relative to the ads. Similarly, the analysis could also be applied to a combined total relevance matrix including the matrices of FIGS. 4b and 4c.

The price module 309 determines the price of presenting the ad to the user. In some embodiments, the price module 309 applies a cost function to determine the cost of placing each ad. In some embodiments, the module 309 uses this cost function to determine how much it will cost to place a particular ad in front of a particular user. In some embodiments, the actual cost charged to an advertiser will be partial or zero, except under specific conditions. For example, an advertiser will only be charged when a user undertakes an action like clicking on an ad, selecting an ad, or otherwise indicating attention invested in an ad. In some embodiments, a partial cost may be charged for placing the ad, and additional cost may be incurred under specific conditions such as those described above. The module 309 can make the cost determination as soon as the user is determined to be online and thus available for viewing the ad, or this determination can be made in advance for placement of that particular ad to that particular user. Since the cost of placing a particular ad before a particular user can be based on many factors described below and can change over time, where the cost management module 309 is doing an offline analysis, the module 309 may have to re-calculate or update the cost regularly or each time a user is available to view an ad (particularly if the user has not logged in for quite a while).

Various factors can be considered in the pricing of ads which can affect the price determined when applying the cost function. For example, the value of each user is relevant to determining the price of placing an ad before that user, as is the relevance of the ad to that user. Placement of different ads can cost different prices, and placement of the same ad can differ based on who the advertiser is and who the ad is being placed to. In some embodiments, the price for a particular advertisement is a function of a particular user x (to whom the ad may be placed), the user population as a whole ($user_{pop}$), the particular ad x to be placed, and the ad population as a whole ($ad_{pep}$), as shown in the example cost function below.

$$price = f_n(user_x, user_{pop}, ad_x, ad_{pop})$$

In other words, the price for placing a particular ad depends on what type of ad it is and on the other ads in the population. If there are many ads of a particular type to be placed, the cost to place that ad might be higher. Similarly, the price to place an ad before a user depends on the particular user and on other users.

In one preferred embodiment, at least a portion of the price could be demand-driven, scarcity-driven, location-driven, industry-driven, etc. For example, in the job search scenario, it would be more costly for a job provider to provide his job ad to a particularly popular candidate that numerous other job providers are interested in hiring. In addition, it might be more expensive to advertise for users in certain fields or certain locations, or both in combination. For example, if software engineering is currently very popular, placing an ad for software engineers can be made more costly. As another example, it would be more expensive to place an ad in the Silicon Valley area if it is hard to find job candidates in that area. Similarly, it can be more expensive to advertise to software engineers in the Silicon Valley area as opposed to software engineers in a more rural area where there are fewer of such jobs and job candidates. Further, if software engineers in the Silicon Valley are scarce and many advertisers want to advertise to them, the price of those ads would be set higher. This price variability is computing by multiplying the advertiser's maximum price (or "bid") by the value of the ad for each advertiser, resulting in a variable price for each ad for each user, which can be stored in a price matrix (described below). In other embodiments, the price is fixed such that each advertiser pays a set price to provide an ad to a user.

In addition, the price can vary depending upon where an ad is placed to a user. For example, it can be made more costly to place an ad at the top of a list of ads or otherwise in a prominent location. In some embodiments, advertisers can provide information regarding where they would like their ad placed (e.g., more prominently for certain users, less for others, etc.) and the module 309 can account for the extra cost for this placement. Each of the price analyses described above can be performed online at the time of ad placement, or can be performed offline (e.g., when the ad is first received).

In some embodiments, the module 309 also applies a payment function for an advertiser indicating what that advertiser is willing to pay to place an ad, and matches the results of application of the cost function against the payment function. Though this payment function analysis could be done online, it would preferably be performed offline. For example, it could be performed when the ad is first received from the advertiser. The advertiser can provide information in advance regarding what he is willing to pay to place an ad. For example, he might provide a maximum cost that he is willing to pay to place any ad. Thus, application of the payment function can simply include a threshold amount. The cost of placing the ad as determined via the cost function can be compared against the threshold amount to determine whether the advertiser is willing to pay to place that ad. The advertiser can indicate that he is willing to pay up to a certain threshold amount to place an ad in front of ideal users meeting most of the advertiser's criteria, but the advertiser may also be willing to pay less to place the ad before users meeting only some criteria. In this more complex case, the payment function can account for how good the match is with a particular user (e.g., whether the user is one of particular interest to the advertiser) in determining whether the advertiser is willing to pay to provide the ad to that user.

In some embodiments, the module 309 accepts bids from advertisers to place ads, and the price of each ad placement can vary depending on how many advertisers are bidding to place an ad. For example, in the job search example, the module 309 can consider how many advertisers are bidding to place ads before a particular candidate, in a particular field or industry, for particular job skills, in a particular location, etc. Advertisers can bid to have ads placed before particular users or groups of users (e.g., all software engineers in the Silicon Valley). Advertisers can bid for ad locations (e.g., more prominently placed vs. less). Advertisers can also bid on particular concepts (possibly including synonyms for those concepts, or more complex patterns or groups of concepts) that are found in a user's profile (e.g., concepts such as "engineer" or "software engineer"). The module 309 can collect bids in real time when a particular user is online and available to view an ad, or the module 309 could collect bids in advance.

In one embodiment, a price matrix, P, can be used to determine the price of placing the ad before a given user. An example is shown in FIG. 4e, for use in determining the price-value vector. For a given user u, the price-value vector equals the price that the advertiser is willing to pay discounted by the value of the user. Thus, price is multiplied by value, as provided in the value matrix, V. For example, Advertiser X may be willing to pay $25 to place his ad in front of a perfect candidate (i.e., a candidate for which his ad is a perfect match). However, Advertiser X may only be willing to pay $5 for a candidate that is a poor match. The Advertiser X can bid or indicate in advance what he is willing to pay for various types or categories of matches. In other words, the advertiser does not need to indicate a price for each user, but instead can identify a price for different categories of users (e.g., users with a perfect score, a score above a certain number (e.g., 0.8), a score between two numbers (e.g., between 0.7 and 1), and so forth). The price identified by the advertiser can be multiplied by the values provided in the value matrix, resulting in a price matrix, P (or price-value matrix). In some embodiments, the advertiser indicates only the highest amount he is willing to pay for a perfect match without stating any other lower prices for less satisfying matches. In this case, the system can calculate out for the advertiser proportionally lower prices based on the lower values. In addition, it is also possible to set a value threshold by which the advertiser can indicate that he is not willing to pay for anything below a certain value.

In some embodiments, instead of using variable prices, the system can use fixed prices, where the advertiser pays a fixed price to present his ad to a user. In this case, the price that appears for a given ad in the price matrix is the same across the row of users. Fixed prices can also be integrated with variable prices so that some advertisers pay fixed prices and some pay variable prices. With fixed prices, the price matrix would work generally the same as described above, but instead of using price multiplied by value, the system uses just the fixed price for those advertiser's providing only a fixed price (or for all advertisers where only fixed prices are used). If the fixed price the Advertiser X is willing to pay is greater than some other advertiser's price (each of which may be a variable price or a fixed price), then Advertiser X's ad is shown, or shown more prominently.

The price matrix, P, can work in the same manner when calculating other types of costs. For example, the system can also calculate the cost per impression, cost per click (e.g., user clicking on the advertisement), cost per action, and so forth. Thus, the advertiser might pay some amount for each time the user clicks on his advertisement, for example.

In some embodiments, the prices in the price matrix, R, are sorted according to price (e.g., in numerical order). For example, the highest pricing ads might be at the top of the list, and the lowest at the bottom (or vice versa). In this manner, the system can review in descending or ascending order down the column in the price matrix, P, the price (or price-value) for each advertiser to place the ad before a particular user. The highest ranking or highest paying ads can be presented first (e.g., emailed first to the user, presented on the first page of the user's search results, presented higher on the list of advertisements on a page, and so forth). Where the ads are sorted according to price or price/value in a price/value vector, the advertisers willing to pay the highest price (discounted by value in a price/value vector) will have their ads presented first or in a more prominent location. The second highest paying advertiser's ad can be presented next, and so forth. The lower ranking ads might not be provided until later or might not be provided at all to that user. In other embodiments, the ads are sorted according to a factor other than price or price-value.

In some embodiments, when the advertiser provides his initial bid price for what he is willing to pay, the system can provide him with information regarding his ranking in relation to what other advertisers are willing to pay. Thus, if his ranking is too low, his ad may not be placed at all. In this case, he may want to increase his bid to increase the chances that his ad will be placed.

The advertisement inventory (e.g., the ads stored in database 320) can be rotated to avoid presenting the same advertisement too many times to a user. For example, where ads are presented online to a user conducting a search, there may be different ads presented on different pages of the search. If the same ads are presented on different pages, they may be in different orders. As another example, where the ads are emailed to a user, the system can be designed to email only a limited number of ads to a given user for a time period (e.g., three ads a week). Where that set number has been reached, that user can be exhausted from the pool of users (e.g., removed from the user supply, with his score set to 0).

As explained above, the online search relevance can also be taken into consideration. The user's search terms used in conducting a search can also be considered when determining what ads to present to the user. In this case, the search relevance can be multiplied by the price or the price-value vector, and the results sorted to produce the top N results that will be presented to the user. This analysis regarding the search relevance can be conducted online, as the search is being conducted, even though the price-value vector may have been computed offline, in advance.

Again, a similar analysis can be performed using the ad-user relevance matrix, R', of FIG. 4c, and a corresponding ad-user value matrix, V', (not shown) to create an ad-user price matrix, P' (not shown).

As explained above, based on the above-described analyses by modules 309, 311, and 313, the ad targeting manager 310 determines whether to present a given advertisement to the user based on the placement factors. The placement factors can also include, for example, whether there was a match between the advertiser profile and the user profile, the degree of match of the advertiser profile and the user profile, the value of placing the ad before the user, the cost of placing the advertisement before the user, willingness of the advertiser to pay a cost of placing the advertisement before the user, etc. Each placement factor can be considered against other placement factors to decide whether a user should see an ad. Further, even if it is determined that a user should see an ad, a given user may be a match for various ads (more than can be presented to the user at a time). Thus the manager 310 may need to consider which ads from a set of matching ads should be presented to that user. Ads not selected to be presented initially might be presented later to the user. Again, where possible, the system 100 may conduct some or all of these analyses offline, though it is also contemplated that the analyses are all conducted online. The manager 310 can use the matching results by module 308 and all of this placement factor information to determine whether the user should view the ad, to possibly rank the ads that matched a given user if the user matched more ads than can be placed at a given time, to decide where the ad should be placed relative to other ads being presented to that user, etc.

The ads to be presented to users are stored in an ad database 320. This ad database 320 can thus store a collection of ads waiting to be served to interested users 110 for that ad. The advertiser provides to the system 100 the one or more ads (e.g., by uploading the ad to the system 100, etc.). As explained above, an advertiser can provide multiple ads to be presented to multiple different sets of interested users 110 by the module 310.

In one preferred embodiment, the ad targeting module 310 monitors what ads are present in the ad database 320 and also keeps track of what users are online. When a user is determined to be online or conducts a search, the system 100 conducts a profile comparison as described above with the profile of the user against each advertiser/ad profile for ads stored in the database 320 to determine in real time what ads should be presented to that user. Alternatively, the system 100 does the comparison in advance to determine whether or not a user is a match for viewing a particular ad. When that user logs in, the ad targeting module 310 can retrieve the ads from the ad database 320 that the system 100 previously determined that user should view. In these embodiments, the module 310 can use the one or more placement factors in advance too or the module 310 can wait to perform this step when the user is available for viewing the ad.

In some embodiments, the module 310 continues to serve that ad each time an interested user 110 logs in. Alternatively, module 310 can be configured to only serve an ad once or a defined number of times to a particular interested user 110 or for a certain time period (e.g., 2 months), and so forth. The advertiser or the system 100 could also set a deadline by which an ad expires and after which it can be removed from the ad database 320.

As explained above, in some embodiments the module 310 sends the ad to the user (e.g., via e-mail or some other mechanism for sending the ad). The user can indicate to the system 100 (e.g., upon creation of a user profile, by providing user preferences, etc.) an interest in having relevant ads and information of interest to the user sent to that user when the system receives those ads or information. For example, a job candidate can request that the system send advertisements for relevant job opportunities to the job candidate when the system receives those ads. In this example, the job candidate can indicate what types of ads are of interest to him (e.g., ads including certain key words, like "software engineer" and "Bay Area") or the system can determine based on the job candidate's profile including resume, stated preferences, etc. what ads would be of interest to that job candidate, and can send relevant ads to the candidate when the system receives such ads.

If a user's profile is updated (e.g., he provides new explicit criteria, revises his resume and resubmits it, the system 100 collects new implicit criteria that result in changes to his profile, etc.) by the profile creation module 306 and he is determined to no longer be an interested user for a particular ad, this information can be transmitted to the ad targeting manager 310 so that ad is no longer presented to that user (where the ad placement determination is performed in advance). If an ad has a particular purpose that is fulfilled (e.g., an ad for a job opening that is filled), the system can remove the ad or the advertiser can request that the ad be removed.

II. Methods

Figure 5A:
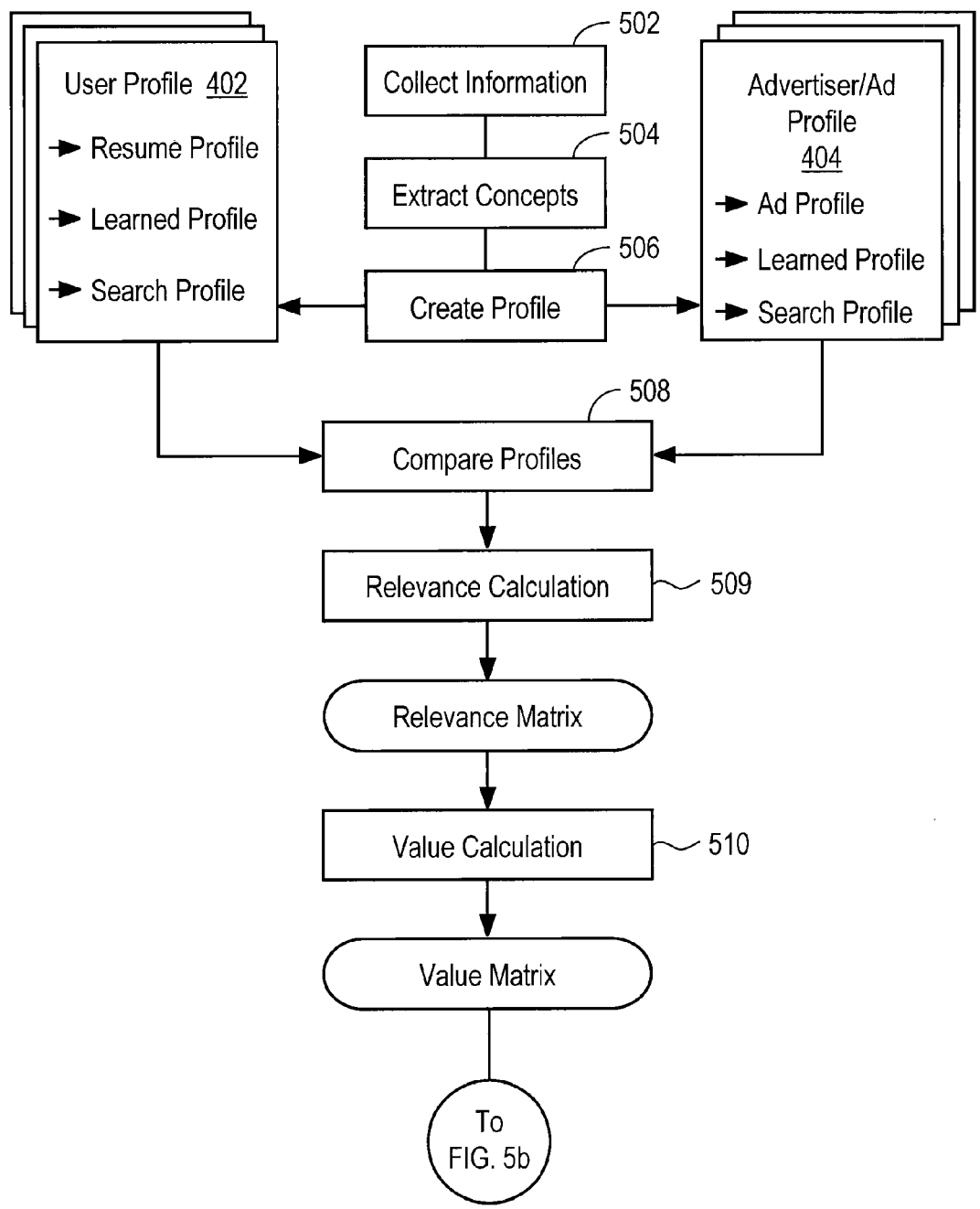
FIG. 5a is a flowchart illustrating steps performed by the ad placement system in placing an advertisement, according to one embodiment of the present invention.

Referring now to FIG. 5*a*, there is shown a flowchart illustrating the methods of the ad placement system 100, according to an embodiment of the invention. It should be understood that these steps are illustrative only. Different embodiments of the system 100 may perform the illustrated steps in different orders, omit certain steps, and/or perform additional steps not shown in FIG. 5 (the same is true for other FIGS.).

As described above, the ad placement system 100 can be associated with a database 300 of information through which the advertiser and/or the user can conduct searches (e.g., a job/resume database). In determining whether to present an advertisement to a user, the system 100 collects 502 advertiser/ad criteria and user criteria, which can each include one or both of explicit or implicit criteria. The advertiser can provide his preferences in users who will view the advertisement. The user can provide his preferences regarding search results in his searches of database 300. For example, the user and/or advertiser can provide documents from which the system 100 can extract useful information about the advertiser's and user's preferences (e.g., a job description, a resume, an ad, etc.). Further, the system 100 collects information regarding the search queries (either used at the time of placing the ad or during any other searches conducted) used by users/advertisers when conducting a search of database 300. Similarly, the system 100 collects 402, 404 implicit criteria based upon actions or feedback provided during searches conducted by the advertiser and/or the user of database 300.

Using the criteria collected 502, the system 100 extracts 504 concepts from the information collected and creates 506 a user profile 402 and an advertiser/ad profile 404. These profiles provide information about the user's and the advertiser's preferences based on the explicit and/or the implicit criteria collected 502. As one of skill in the art would further appreciate, these operations occur per user and per advertiser.

In a given instance of the matching process (e.g., where the system 100 is determining whether to provide a particular advertiser's ad to a particular user), the system 100 compares 508 the advertiser profile and the user profile (or concepts extracted from these profiles) to determine a degree of match score between the ad and the user and, based on this score, determines whether the user is a match for viewing the ad. The system can use this information in its ad targeting analysis for determining whether to provide the ad to the user based on certain placement factors, as explained above. In some embodiments, the system 100 performs a relevance calculation 509 and applies a relevance matrix for this comparison and for use in targeting the ad to the appropriate users. The system 100 can also perform a value calculation 510 and apply a value matrix to target the ad to the most valuable users.

Figure 5B:
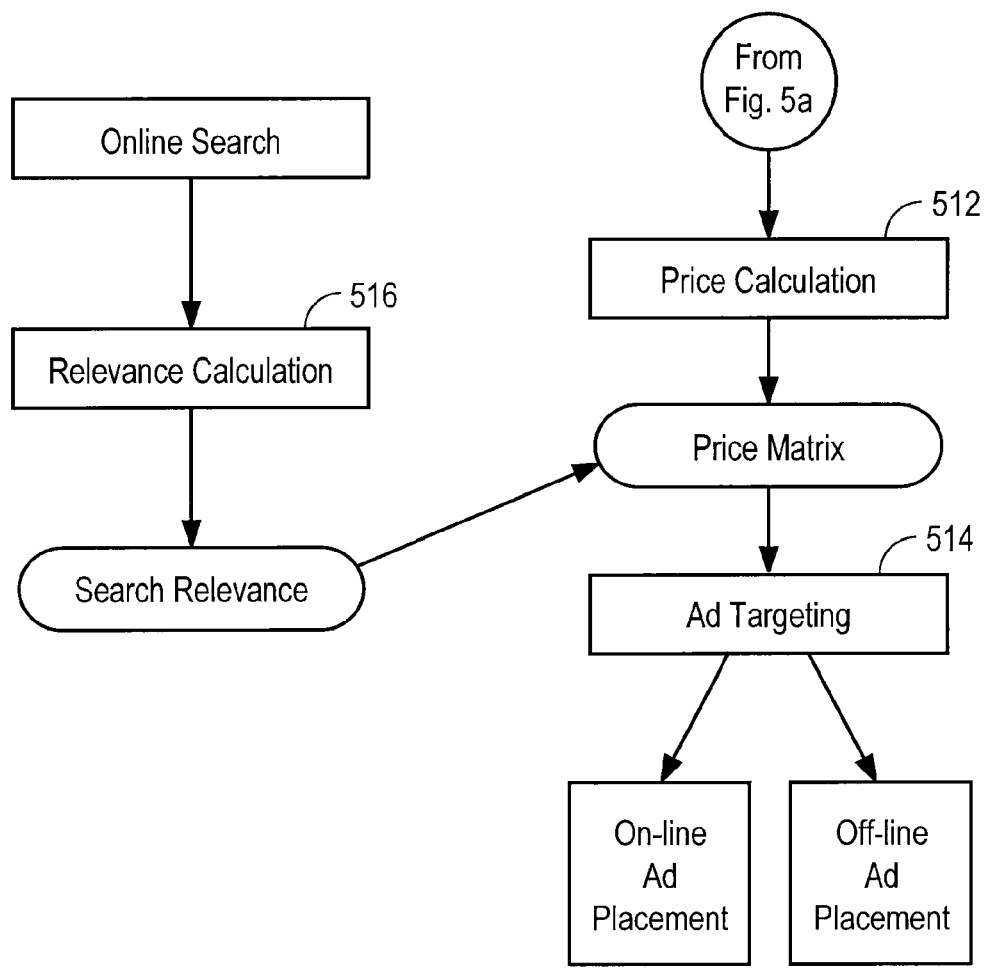
FIG. 5b is a flowchart illustrating steps performed by the ad placement system in placing an advertisement, according to one embodiment of the present invention.

Referring now to FIG. 5*b*, there is shown a continuation of the flowchart of FIG. 5*a* illustrating the methods of the ad placement system 100, according to an embodiment of the invention. The system can also perform a price calculation 512 for placing an ad before a user. In some embodiments, the system 100 applies a price vector in combination with the value matrix for this pricing. In some embodiments, the system determines what the advertiser is willing to pay to place that ad before that user by multiplying the maximum price the advertiser is willing to pay by the value of that user to the advertiser, where the value is provided by the value matrix. The system 100 can then sort the results according to price to determine which ads from the ad population should finally be placed before this user. Based on these relevance, value, and pricing determinations, the system performs ad targeting 514 to place the ads before the users.

In one embodiment, the user's online search is taken into account in ad targeting 514. The search terms provided by the user in conducting the search can be compared against the available ads via a search relevance determination 516 similar to the relevance determination described above, resulting in determining a search relevance score for this online search. The search relevance score can be combined with information provided in the price-value matrix that was calculated offline to result in an online targeting and placement of the ad to the user according to the search results.

Each of the above-described steps can be performed either offline or online, as explained above. In one embodiment, all of the steps occur offline other than steps involving the user's online search terms. In another embodiment, the collection 502, extraction 504, and creation of the profile 506 occur offline, but the comparison 508 of the profile and the remaining steps occur online, as the user is conducting a search. This mechanism avoids the problem of the comparison going stale over time and having to be updated regularly. In still another embodiment, the steps 502, 504, and 506 associated with creating the user's profile occur online, as well. For example, the user profile might only include the search string of the current search being conducted by the user, and the collection of this information and matching 508 to ads is performed online. In still a further embodiment, a combination of these offline and online methods are used, where as much work as possible is performed offline, but additional work is performed online, as needed.

III. Job Searching Embodiment

Figure 6:
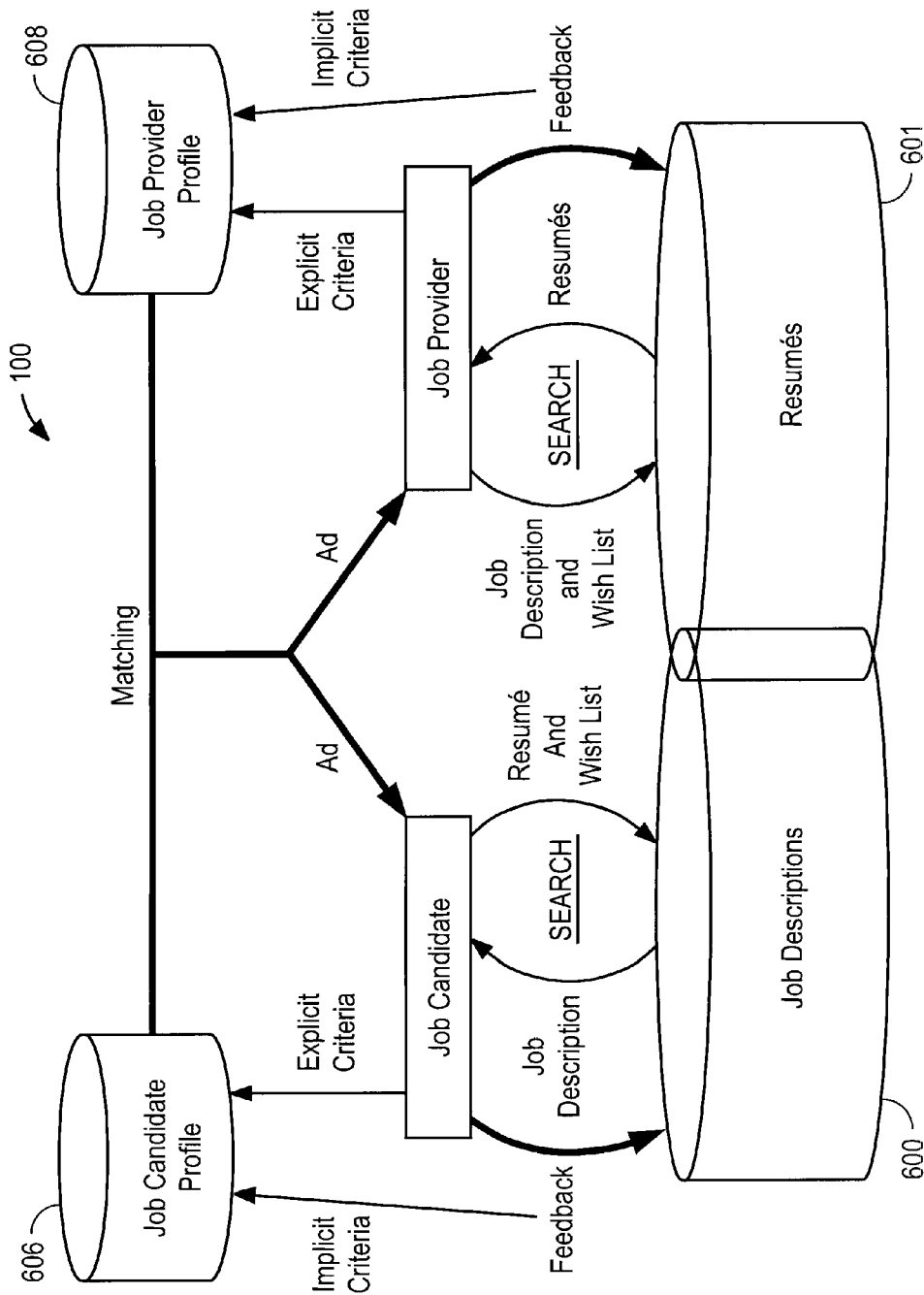
FIG. 6 is high-level block diagram illustrating the ad placement system in a job search embodiment.

FIG. 6 is a there is shown a high level block diagram illustrating the ad placement system 100 in a job searching embodiment. In this embodiment, an advertiser is placing an advertisement before a user conducting a job search (e.g., a search through job descriptions for a job opening or a search through resume's for a job candidate). In one example of a job search embodiment, the job provider is the advertiser who is interested in placing an ad regarding his job opening before an interested job candidate (the user). In another example of a job search embodiment, the job candidate is the advertiser who is interested in placing an ad about himself as a job candidate before an interested job employer (the user). Thus, either the job candidate or the job provider can act as an advertiser or a user.

In the job search embodiment, the job candidate and/or the job provider can be conducting searches of one or more databases, similar to database 300 illustrated in FIG. 3. The job candidate conducts one or more searches of a database 600 of job descriptions in the hopes of finding a job opening of interest. The job candidate can input a search query or a wishlist of desired characteristics in a job (e.g., software engineer, Bay Area, etc.) and/or the job candidate can insert his resume that can be matched against the job description database 600. The job candidate's search returns search results including a collection of job descriptions matching his wishlist and/or his resume. Similarly, the job provider conducts one or more searches of a database of resumes in the hopes of finding the resume of a job candidate of interest. The job provider can be an employer at a company, a hiring manager, a recruiting officer, or some other party associated with the hiring of individuals to fill job openings. The job provider can input a search query or a wishlist of desired characteristics in a job candidate (e.g., software engineer, 5 to 7 years of experience, graduated from top tier school, etc.) and/or the job provider can insert the job description for the job opening he is trying to fill that can be matched against the resume database 601. The job provider's search will return search results including a collection of job descriptions matching his wishlist and/or his job description.

As described above regarding the general system and methods, the job search embodiment also involves collecting information regarding advertiser criteria indicating preferences of the advertiser in users to be presented with the advertisement and collecting information regarding user criteria indicating preferences of the user in search results for the job search. Both the job candidate and the job provider can provide explicit criteria regarding preferences including providing this information to the system 100 directly (e.g., when creating an account for conducting searches, etc.), providing documents to the system 100 (e.g., such as a resume for the job candidate or a job description for the job provider) from which relevant profile information can be extracted, and so forth. In addition, the system 100 can collect implicit criteria based on the feedback received by the job candidate on the job description search results received (the feed back can also include actions of the job candidate relating to the search results, such as selecting certain results first). Thus, the candidate can review each of a number of job descriptions provided in response to a query, and rate any number of them along some provided scale (e.g., 1-5; acceptable/unacceptable, etc.). Similarly, a job provider can review a number of resumes of potential candidates, and likewise provide feedback as to how well each (or some) of the candidates fit the job requirements. These explicit and/or implicit criteria can be stored in the job candidate profile 606 (indicating the job candidate's preferences in a job) and job provider profile 608 (indicating the job provider's preferences regarding types of job candidates who should see the ad and types job candidates of interest to fill the job opening being advertised), respectively.

Where the job provider is the advertiser, the job provider can provide the system 100 with the ad that he would like provided to interested and relevant job candidates. In the placement of this ad, the system 100 can compare a given job candidate profile 606 with the job provider profile 608 (where the job provider 608 has multiple ads to place, the comparison is with the profile 608 or section of the profile 608 for the relevant ad to determine whether the job candidate is a match for viewing that ad. Those job candidates with whom a match is found are considered to be interested users 110 before whom the ad may be placed. The system 100 can consider various placement factors including how good the match is, cost information, etc. in its decision regarding placement of the ad. Similarly, where the job candidate is the advertiser, the job candidate can provide the system 100 with ads for the job candidate himself, advertising his employment qualities, interesting information from his resume, what kind of job he is seeking, and/or other information. In the placement of this ad, the system 100 can again match job candidate and job provider profiles to determine what job providers should view the ad. Similar methods to those described above can be used in placing the job candidate's ad before the right job providers.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments. Accordingly, the disclosure of the present invention is intended to be illustrative, but not limiting, of the scope of the invention, which is set forth in the following claims.

I claim:

1. A method for targeting advertisements to users, the method comprising:
   using at least one computer system to perform steps comprising:
      receiving advertisements regarding job openings from a plurality of advertisers;
      receiving feedback from each of the plurality of advertisers about search results provided to the advertiser in a search conducted by the advertiser for a job candidate to fill a job opening;
      determining, based on the feedback received from the advertisers, implicit criteria that indicate hidden preferences of each of the advertisers about which job candidates to target with an advertisement of the advertiser;
      receiving feedback from job candidates about job search results provided to each of the job candidates;
      determining, based on the feedback provided by the job candidates, implicit criteria for the job candidates;
      creating a plurality of advertiser profiles, each using implicit criteria for a given advertiser;
      creating a plurality of job candidate profiles, each using implicit criteria for a given job candidate;
      comparing the advertiser profiles and the job candidate profiles to generate relevance scores and determine matches between the advertiser profiles and the job candidate profiles;
      determining which of the advertisements received to present to each of the job candidates based on a relevance of each of the advertisements to each of the job candidates and a value of each of the job candidates to each of the advertisers based on the relevance of each of the advertisements to each of the job candidates; and
      presenting for display to each of the job candidates at least one of the advertisements determined for the job candidate.

2. The method of claim 1, further comprising receiving explicit criteria from the advertisers, the explicit criteria used to provide the search results to the advertisers and used in the advertiser profiles.

3. The method of claim 1, further comprising:
   extracting concepts from the advertisements received; and
   comparing the concepts extracted to a knowledge base of linked concepts to generate a set of relevant concepts for use in matching the job candidate profiles with the advertiser profiles.

4. The method of claim 1, further comprising receiving explicit criteria from the job candidates, the explicit criteria used to provide the search results to the job candidates, the explicit criteria for each of the job candidates providing information about which advertisements the job candidate should view.

5. The method of claim 1, further comprising:
   extracting concepts from resumes received from the job candidates; and
   comparing the concepts extracted to a knowledge base of linked concepts to generate a set of relevant concepts for use in matching the job candidate profiles with the advertiser profiles.

6. The method of claim 1, wherein determining which of the advertisements to present further comprises determining an order in which to present the advertisements to the job candidates or determining a location at which the advertisement should be placed relative to other advertisements being presented to the job candidate.

7. The method of claim 1, wherein the relevance comprises a relevance matrix providing the relevance scores for the relevance of a given advertisement to each of the job candidates.

8. The method of claim 7, wherein the value comprises a value matrix providing value scores for the value of presenting a given advertisement to each of the job candidates, the value scores calculated based on the relevance scores.

9. The method of claim 8, wherein the value is calculated in terms of supply and demand, where supply equals a sum of the relevance scores of the job candidates against each advertisement, where demand equals a sum of the relevance scores of each advertisement against the job candidates, and where supply and demand are inversely related.

10. The method of claim 1, wherein the determination of which of the advertisements received to present to each of the job candidates is further based on a price for presenting the advertisement to each of the job candidates.

11. The method of claim 10, wherein the price of each advertisement is computed by multiplying a maximum price that the advertiser is willing to pay for the advertisement by the value of the advertisement for a job candidate, where the value of the advertisement for the job candidate is stored in a value matrix, thereby forming a vector of prices for each of the advertisements for the job candidate, the vector being sorted in descending order with higher ranking advertisements being presented first.

12. The method of claim 10, wherein the price is variable and is determined as a price value vector by taking the price that the advertiser is willing to pay to present the advertisement to a given job candidate multiplied by the value for that job candidate.

13. The method of claim 1, wherein each of the advertiser profiles are updated over time to include information learned about job candidate preferences of the advertiser based on actions of the advertiser with regard to search results presented in a plurality of searches.

14. The method of claim 1, wherein each of the job candidate profiles are updated over time to include information learned about job preferences of the job candidate based on actions of the job candidates with regard to search results presented in a plurality of searches.

15. The method of claim 1, further comprising accepting one or more price bids from advertisers to present their advertisements to the job candidates according to a quality of the match between the advertiser profiles and job candidate profiles.

16. The method of claim 1, further comprising setting a value threshold indicating that the advertiser is unwilling to pay to present the advertisement to users having values below the threshold.

17. The method of claim 1, wherein the implicit criteria for the advertiser are inferred from ratings provided by the advertiser of job candidates included in the search results provided to the advertiser.

18. The method of claim 1, wherein the implicit criteria for the advertiser are inferred from actions taken by the advertiser on the search results provided to the advertiser.

* * * * *